United States Patent
Rouhet et al.

[11] Patent Number: 5,980,105
[45] Date of Patent: Nov. 9, 1999

[54] DEVICE OF OPTICALLY MEASURING A CRYOGENIC TEMPERATURE

[75] Inventors: Jacky Y. Rouhet, Saint Marcel; Gilbert M. Tribillon; Stéphane F. Bertrand, both of Besancon; Georges Boulon, Lyons, all of France

[73] Assignee: Societe Europeenne de Propulsion, Suresnes, France

[21] Appl. No.: 08/412,916

[22] Filed: Mar. 29, 1995

[30] Foreign Application Priority Data

Mar. 30, 1994 [FR] France ................................ 94 03797

[51] Int. Cl.$^6$ .................................................. G01K 11/00
[52] U.S. Cl. ............................................ 374/161; 374/142
[58] Field of Search ................................. 374/161, 142; 250/216, 578.1, 458.1, 459.1; 252/301.4 R; 356/28

[56] References Cited

U.S. PATENT DOCUMENTS

| | | |
|---|---|---|
| 3,637,518 | 1/1972 | Nada et al. . |
| 3,786,365 | 1/1974 | Robinson et al. . |
| 3,883,748 | 5/1975 | Nada et al. . |
| 4,039,834 | 8/1977 | Lucas et al. . |
| 4,533,489 | 8/1985 | Utts et al. . |
| 4,729,668 | 3/1988 | Angel et al. . |
| 4,776,827 | 10/1988 | Greaves . |
| 4,880,972 | 11/1989 | Brogardh et al. ............... 374/161 |
| 4,895,156 | 1/1990 | Schulze ........................... 128/634 |
| 5,036,194 | 7/1991 | Hazel .............................. 374/161 |
| 5,255,980 | 10/1993 | Thomas et al. ................... 374/161 |
| 5,290,103 | 3/1994 | Fevrier et al. ................... 374/161 |
| 5,322,361 | 6/1994 | Cabib et al. .................... 374/161 |
| 5,348,396 | 9/1994 | O'Rourke et al. ............... 374/161 |

FOREIGN PATENT DOCUMENTS

| | | |
|---|---|---|
| 0175352 | 3/1986 | European Pat. Off. . |
| 69131 | 3/1987 | Japan ............................. 374/161 |

OTHER PUBLICATIONS

"Spectra, Kinetics, and Polarization of the Luminescence of $CaF_2$–$Yb^2$+ Crystals", A.A. Kaplyanskii, et al, Optics and Spectroscopy, vol. 41, No. 6, Dec. 1976, Washington, D.C., pp. 615–619.

"Fluorescence Properties of Alkaline Earth Oxyanions Activated by Divalent Ytterbium", Frank C. Palilla, et al, Journal of the Electrochemical Society, vol. 117, No. 1, Jan. 1970, Manchester, N.H. U.S. pp. 87–91.

(List continued on next page.)

*Primary Examiner*—Anthony Knight
*Assistant Examiner*—John L. Beres
*Attorney, Agent, or Firm*—Weingarten, Schurgin, Gagnebin & Hayes LLP

[57] ABSTRACT

The present invention relates to a device for optically measuring the temperatures of cryogenic fluids or of moving surfaces in such fluids by analyzing the decay in the luminescence of a doped crystal, the device comprising a light source for exciting said crystal, an optical fiber for transporting the light flux emitted by said source to the crystal and for returning to a detection assembly the luminescent light emitted by the crystal as a result, and a measurement probe past which the fluid or the moving surface moves, wherein the doped crystal is constituted by one of the crystals from the group comprising strontium fluoride doped with divalent ytterbium, $SrF_2$:$Yb^{2+}$; and calcium fluoride doped with divalent ytterbium, $CaF_2$:$Yb^{2+}$. In a preferred embodiment for measuring the temperatures of moving surfaces, the measurement probe includes a fiber for transmitting the light flux emitted by the light source plus at least one receiver fiber for returning the light emission given off by the doped crystal which is presented in the form of a crystal covering covering a determined location on the surface to be scanned, each of said fibers being surrounded by a metal capillary.

7 Claims, 5 Drawing Sheets

OTHER PUBLICATIONS

"Phosphor–based Thermometry of the Rotor in a High–Power Electrical Generator", L. Mannik, et al., Applied Optics, vol. 30, No. 19, Jul. 1, 1991, New York, U.S. pp. 2670–2672.

"Monitoring Permanent–Magnet Motor Heating with Phosphor Thermometry", Stephen W. Allison, et al., IEEE Transactions on Instrumentation and Measurement, vol. 37, No. 4, Dec. 1988, New York, U.S., pp. 637–641.

"Development of a High–Temperature Fiber–Optic Thermometer Probe Using Fluorescent Decay", K.T.V. Grattan, et al., Review of Scientific Instruments, vol. 62, No. 5, May 1991, New York, U.S., pp. 1210–1213.

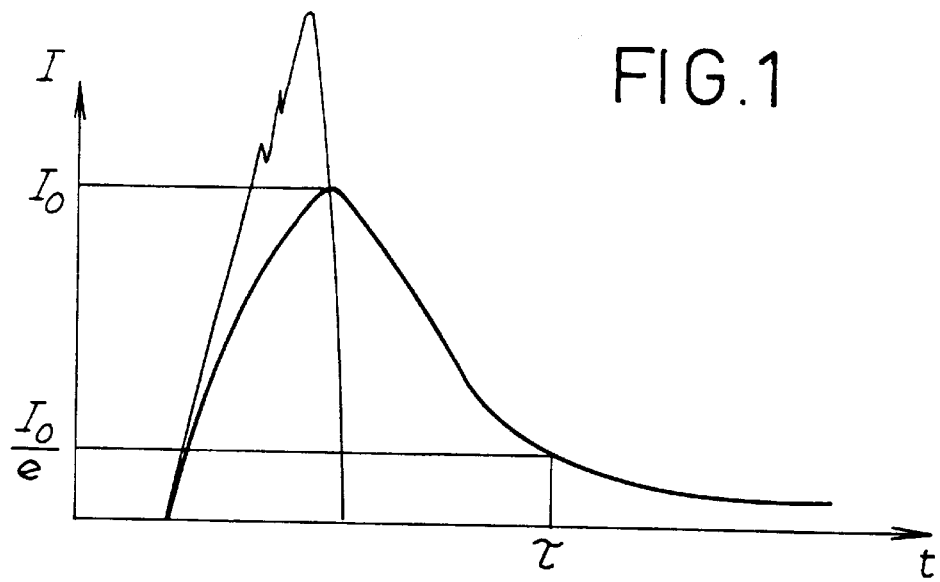
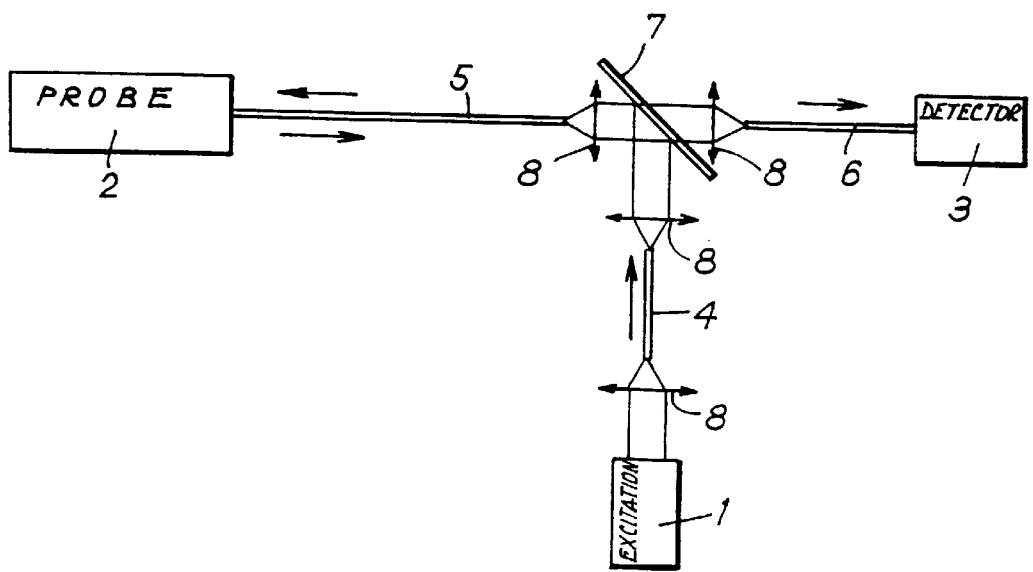

DEVICE OF OPTICALLY MEASURING A CRYOGENIC TEMPERATURE

FIELD OF THE INVENTION

The present invention relates to a device for measuring cryogenic temperatures in the range 20 K to 120 K (temperatures which correspond in particular to oxygen and hydrogen while in the liquid phase) by optical techniques that implement photoluminescent crystals.

PRIOR ART

The measurement of temperature by means of photoluminescent crystals is now well known, and is based on the fact that the luminescence emitted by a crystal luminophor, when the luminophor is optically excited by a light source, decays exponentially with a duration that varies with temperatures.

Patent application EP 0 259 027 discloses such an optical measurement device using a luminophor based on chromium-doped aluminum oxide. U.S. Pat. No. 4,895,156 describes another application of such a device in the medical field, and its description refers to a multiplicity of articles and patents relating to this subject and showing that numerous crystals are available to cover a wide range of temperatures.

In spite of that abundant literature, and even though an industrial need exists, proposals have never been made for a temperature sensor that provides high performance measurement, i.e. with response times shorter than 1 millisecond and with acquisition rates that may be as high as 1,000 measurements per second, under extreme environmental conditions that combine cryogenic temperatures in the range 20 K to 120 K and high pressures that may reach 200 bars

SUMMARY OF THE INVENTION

An object of the present invention is to provide such a device for measuring temperature optically. Another object of the invention is to make it possible both to measure the temperature of a moving fluid and the temperature of a moving surface, with flow speeds or displacement speeds that are high, being of the order of 100 meters per second (m/s) to 300 m/s. Another object is to provide a device that is simple, robust, and reliable, and that also makes measurements possible in locations that are difficult of access. More particularly, the device of the invention must be adapted to measuring highly-oxidizing fluids, such as oxygen, for example.

These objects are achieved by a device for optically measuring the temperatures of cryogenic fluids or of moving surfaces in such fluids by analyzing the decay in the luminescence of a doped crystal, the device comprising a light source for exciting said crystal, an optical fiber for transporting the light flux emitted by said source to the crystal and for returning to a detection assembly the luminescent light emitted by the crystal as a result, and a measurement probe past which the fluid or the moving surface moves, wherein the doped crystal is constituted by one of the crystals from the group comprising strontium fluoride doped with divalent ytterbium, $SrF_2$:$Yb^{2+}$; and calcium fluoride doped with divalent ytterbium, $CaF_2$:$Yb^{2+}$.

By choosing these two types of luminophor and by using their properties at low temperatures, it is possible to provide a highly accurate device for measuring temperature optically in extreme environments.

In a first embodiment of the invention, more particularly intended for measuring the temperatures of moving surfaces in a cryogenic fluid, the measurement probe of the device is constituted by a housing in which a metal capillary is placed that surrounds at least one optical fiber for transmitting the light flux emitted by the light source and for returning the light emission given off by the doped crystal, and the doped crystal is present in the form of a crystal covering a determined location on the surface to be scanned.

By limiting the thermal response time of the probe, the presence of a metal capillary surrounding the optical fiber makes it possible to obtain particularly high-performance measurement while still providing the fiber with all the rigidity it requires for use at high pressures and at high flow speeds.

Preferably, the measurement probe further includes an optical fiber for transmitting and receiving synchronizing light emission, and the surface to be scanned further includes at least one mark reflecting said light emission and placed in the displacement direction of the surface at a determined distance from the crystal covering.

Thus, it becomes possible to perform a measurement at a predetermined location of the surface to be scanned without it being necessary to cover the entire surface with the luminophor. In addition, for rotating bodies, there is no longer any need to perform an auxiliary speed measurement to synchronize temperature measurements.

The measurement probe may include a single bidirectional fiber surrounded by a metal capillary, with the assembly being mounted in the housing, or indeed it may comprise one fiber for transmitting the light flux emitted by the light source and at least one receiver fiber for retransmitting the light emission returned by the crystal covering, each of said fibers being surrounded by a metal capillary.

Advantageously, the housing further includes a lens placed at the outlet of the optical fiber(s).

In order to increase the performance of the above-specified probes at low speeds, additional focusing means may be disposed at the outlet from the receiver fibers between the probe and the surface to be scanned.

When the probe includes a synchronization fiber, the excitation light source is controlled on the basis of a detector device receiving the light flux emitted by a synchronization emitter and returned by the reflecting marks, the detection assembly receiving in succession light emissions emitted by the crystal covering via each of the receiver fibers, and the device of the invention further includes a processor circuit receiving information from the light source, from the detection assembly, and from a memory containing a set of predetermined values.

The device of the invention makes it possible to measure temperature at a given location entirely automatically, and by providing exact knowledge about the displacement speed of the body, the presence of the reflecting marks makes it possible firstly to adapt the measurement to the speed by choosing which receiver fibers should be taken into account for performing the measurement, and secondly to trigger the excitation laser source at the appropriate moment.

The processor circuit includes a first circuit for determining the duration $\tau$ of the decay of luminescence from the crystal covering, and a second circuit for computing the temperature of the surface to be scanned on the basis of values stored in the memory. It may also include a third circuit for computing the displacement speed of the surface to be scanned.

In a second embodiment designed for performing measurements on cryogenic fluids that are moving, the measurement probe is constituted by a housing with the doped crystal being placed at the end thereof, and by a metal capillary surrounding an optical fiber for transmitting light flux emitted by the light source and for returning the light emission given off by the doped crystal, the capillary being placed in said housing in contact with the doped crystal.

By this structure, it is possible to obtain probes of very small dimensions that are particularly robust because of the presence of a metal-type capillary, which capillary also makes it possible to achieve a measurement response time that is particularly short.

In a variant embodiment, the measurement probe is constituted by a housing having the doped crystal at the and thereof in the form of a crystal covering, a capillary surrounding an optical fiber for transmitting the light flux emitted by the light source, and for returning the light emission given off by the crystal covering being placed in said housing facing said covering and defining a chamber between the end of said fiber and the covering, and the housing includes at least one fluid inlet orifice disposed perpendicularly to the axis of the fiber and opening out into the chamber, and at least one fluid outlet orifice opposite to the fluid inlet orifice.

Because of the direct contact between the fluid and the luminophor, thermal equilibrium of the probe is achieved very quickly and the resulting response times can be further reduced. In addition, the absence of contact between the fiber and the luminophor does not make it essential to use a capillary that is of metal type.

Advantageously, the measurement probe includes a single inlet and outlet orifice constituted by an opening passing right through the housing at the chamber.

Preferably, a lens is placed at the outlet from the fiber at the wall of the chamber opposite to the crystal covering.

Naturally, and particularly for determining the temperature of a rotating body, the device of the invention may be implemented with a single measurement probe including a synchronization fiber, a transmission fiber, and a single receiver fiber just as it can be implemented using a plurality of measurement probes distributed around the rotary body and separated from one another by angular offsets a (a single probe as shown, together with probes each provided with a single receiver fiber).

BRIEF DESCRIPTION OF THE DRAWINGS

Other characteristics and advantages of the present invention appear more clearly from the following description given by way of non-limiting indication and reference to the accompanying drawings, in which:

FIG. 1 shows the excitation and decay curves for the luminescence of a doped crystal;

FIG. 2 is a general theoretical diagram of an optical device for measuring temperature by analyzing the decay of the luminescence of a doped crystal;

DESCRIPTION OF PREFERRED EMBODIMENTS

Figure 3:
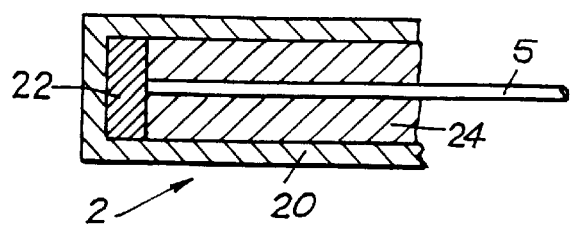
FIGS. 3, 4, 5a, and 5b are examples of measurement probes implemented in the device of FIG. 2 for measuring the temperatures of moving fluids.

Temperature measurement by means of photoluminescent crystals and of optical fibers is based on a principle that is well known and that relies on measuring the duration τ of the decay in luminescent light emission from a crystal luminophor after it has been optically excited by means of a light pulse delivered by a light source such as a xenon lamp or a light emitting diode (LED) for example.

The decay of the luminescence is of the exponential type (see FIG. 1):

$$I=I_0 e^{-t/\tau}$$

where τ is the decay duration and depends both on the temperature and on the crystal used.

FIG. 2 is a theoretical diagram of one example of a measurement device that implements the above-mentioned method of measuring temperature. The device comprises firstly an excitation light source 1 which emits light pulses destined for a doped crystal that constitutes the active element of a measurement probe 2, and secondly a luminescence detector 3 which receives the luminescent light emission returned by the doped crystal. Optical fibers 4, 5, and 6 serve to transmit the exciting light pulse to the probe and to return the light emission from the crystal to the detector. Advantageously, in order to limit the number of fibers used by the device, a separator 7 is located at the inlet to a bidirectional measurement fiber 5 that terminates at the probe 2. Where necessary, focusing means 8 enable the inlet and outlet light of the various optical fibers to be focused.

The inventors have been able to observe that with presently used luminophors, the above device is incapable of providing high-performance measurements under extreme environmental conditions. In particular, at present, there does not exist a device for measuring the temperature of moving fluids or surfaces that is capable of operating in the temperature range 20 K to 200 K and at pressures of up to 200 bars. Thus, the inventors have developed two divalent ytterbium-doped crystals, one based on strontium fluoride $SrF_2:Yb^{2+}$, and the other based on calcium fluoride $CaF_2:Yb^{2+}$, both of which present good characteristics at low temperatures and which are used for implementing a specially adapted measurement device. The first luminophor is preferably used in a first temperature range of 20 K to 80 K, while the second is used in the range 80 K to 120 K. These luminophors have the advantage of having very good sensitivity at low temperatures, and decay durations that are quite short (<1 ms) so as to make it possible to achieve acquisition rates of up to 1,000 measurements per second, while nevertheless having decay rates that are high enough to avoid interference from parasitic luminescence of very short duration. These luminophors are excited by a laser source that emits in the ultraviolet at a wavelength of about 350 nm, and the resulting photoluminescent emission appears in the visible spectrum respectively at about 650 nm for $SrF_2:Yb^{2+}$ and about 560 nm for $CaF_2:Yb^{2+}$.

To measure the temperature of cryogenic fluids, the measurement probe 2 may have any of the various structures shown in FIGS. 3 to 5b.

In FIG. 3, the probe 2 comprises a housing 20 in the form of a tube with the doped crystal 22 being placed at the end thereof. A (capillary) metal capsule 24 surrounds the free end of the single measurement optical fiber 5 and serves to support it, being stuck against the crystal and closing the housing. The crystal is thus directly in contact with the outlet end of the fiber and is protected from direct action of the fluid by being encapsulated in the housing. The thickness of the end wall of the housing is preferably small, but is sufficient to ensure that the probe is rigid, thus enabling the probe to have very small dimensions (in the range two to ten times the diameter of the optical fiber, and in practice 2 mm to 3 mm), thereby enabling it to be used in locations that are difficult of access. In addition, it is important to observe that using a metal capillary makes it possible to reduce the thermal response time of the probe, unlike using glass capillaries as is done in the prior art.

Figure 4:
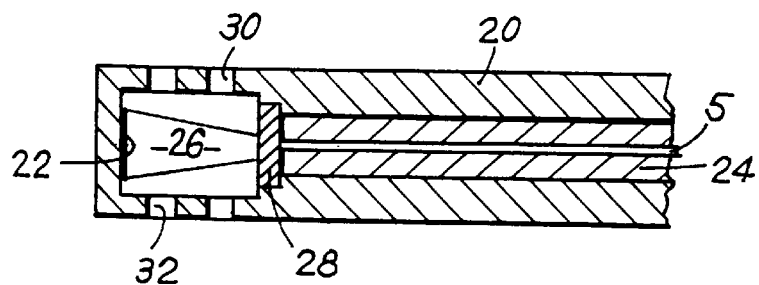
Figure 5A:
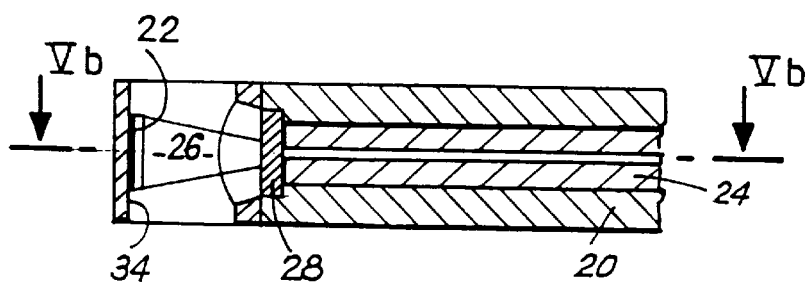
Figure 5B:
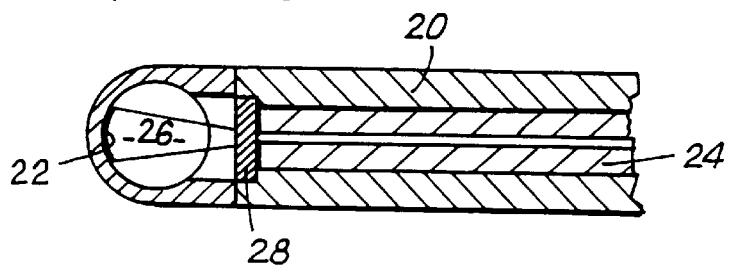

In the probe of FIG. 4 which is more particularly adapted to flows at moderate speed while still allowing very fast response times (<1 ms) because of direct contact between the luminophor and the fluid, the end wall of the housing (which constitutes a target for the light flux leaving the fiber) is covered in a coating of luminophor 22 and forms one of the walls of a chamber 26 whose wall facing said wall that receives the luminophor is constituted by a lens 28 that constitutes a porthole, with the capillary 24 surrounding the fiber 5 being stuck to the anterior face thereof. This chamber includes an admission (inlet) orifice 30 and an expulsion (outlet) orifice 32 for the fluid that flows therethrough, which orifices are disposed facing each other perpendicularly to the axis of the fiber. In FIG. 5a (and in FIG. 5b which is a section on plane Vb—Vb), these orifices are replaced by a single opening 34 passing right through the housing 20 via the chamber 26. Given the absence of contact between the luminophor covering and the optical fiber, there is no need for the capillary to be made of metal, so it is possible to use a glass capillary in the above two versions. However, because direct contact between the fluid and the luminophor does not require thermal equilibrium to be achieved before a first measurement is taken, it is possible to reduce the response time of the probe considerably.

For each of these configurations, the luminophor covering is constituted by a powder of the above-specified doped fluorides mixed with an adhesive that withstands low temperatures. It may be observed that a mixture of said powder with a metal oxide powder embedded in silica could also be envisaged, with the mixture being deposited on the end wall of the housing by an appropriate method.

Figure 6:
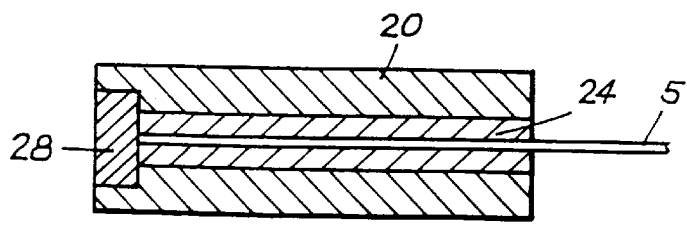
FIGS. 6 and 7 show examples of measurement probes implemented in the device of FIG. 2 for measuring the temperatures of moving surfaces.
Figure 7:
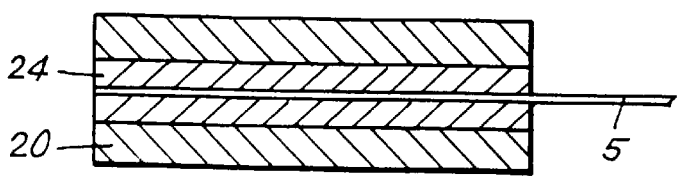

To measure the temperature of stationary walls, the measurement probe may be simplified, as shown by the structures of FIGS. 6 and 7.

In FIG. 7, the structure of the probe is restricted to the open-ended housing 20 in which the metal capillary 24 surrounding the fiber 5 is placed, with the free end of the fiber directly facing the surface to be scanned, whereas in FIG. 6, the housing 20 is closed by a porthole-forming lens 28, the fiber and the capillary surrounding it being stuck to the anterior face of the lens. In both configurations, the luminophor is present in the form of a covering applied directly to the stationary surface to be scanned that faces the end of the probe. The types of covering used are naturally identical to the types described above.

In contrast, for measuring the temperature at the surface of a wall that is moving in translation or in rotation, a temperature probe is proposed, that includes a plurality of fibers, one of which, 50 (see FIG. 8) serves to transmit the light flux coming from the excitation source 1 to the wall 9 in question while the others, e.g. two fibers 51 and 52 pick up the electroluminescent emission from the luminophor covering and convey it to a detector 3 (where the number two is not limiting). As before, these fibers are surrounded by a metal capillary 24 and they are optionally kept separate from the wall 9 by a lens 28. The fibers are in alignment in the wall-displacement direction, with the fiber 50 for transmitting the excitation flux necessarily preceding the fibers 51 and 52 that pick up the luminescent emission.

Figure 8:
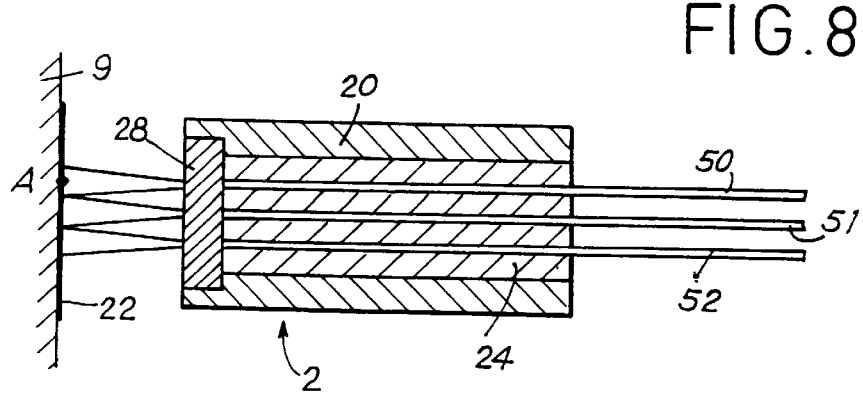
FIG. 8 shows another example of a measurement probe using a plurality of receiver fibers for receiving the luminescence of the excited crystal.
Figure 9:
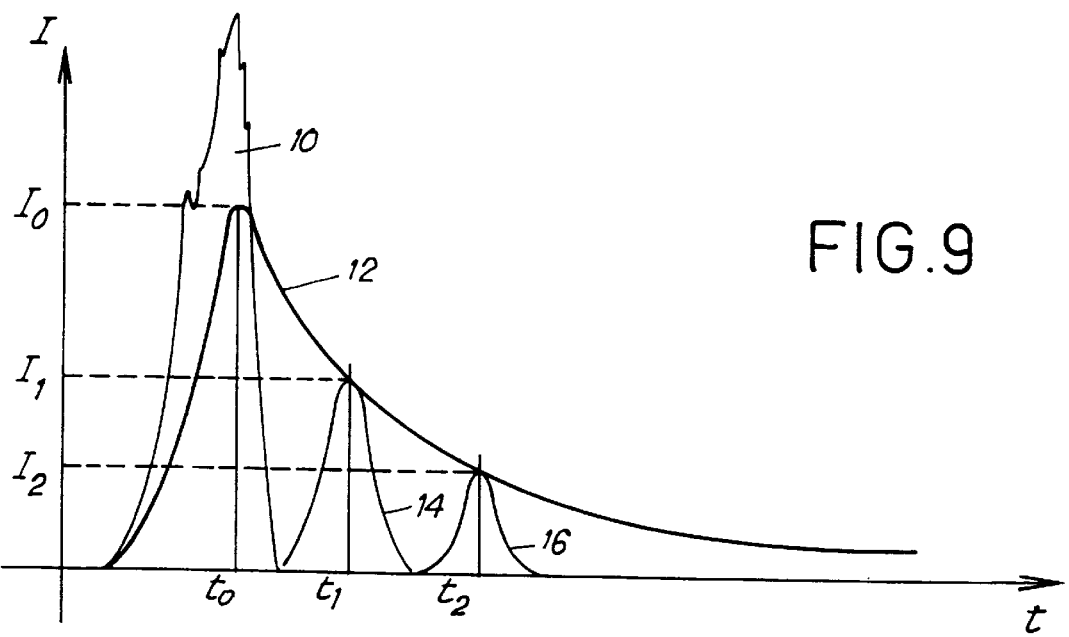
FIG. 9 shows excitation and decay curves for the luminescence of a doped crystal in the example of a probe shown in FIG. 8.

FIG. 9 shows the signals picked up at the outputs from the two receiver fibers of FIG. 8 in comparison with the excitation signal 10 in the transmission fiber and the decay characteristic 12 of the luminophor. Point A (see FIG. 8) is excited at time $t_0$ by the light flux leaving transmission fiber 50. At $t_0+\Delta t$ the first receiver fiber 51 picks up the luminescence from point A, and at $t_1+\Delta t$ the second receiver fiber 52 does the same. The decay duration $\tau$ is then merely proportional to the logarithm of the ratio of the received light fluxes (or of the received light intensities I).

Figure 10:
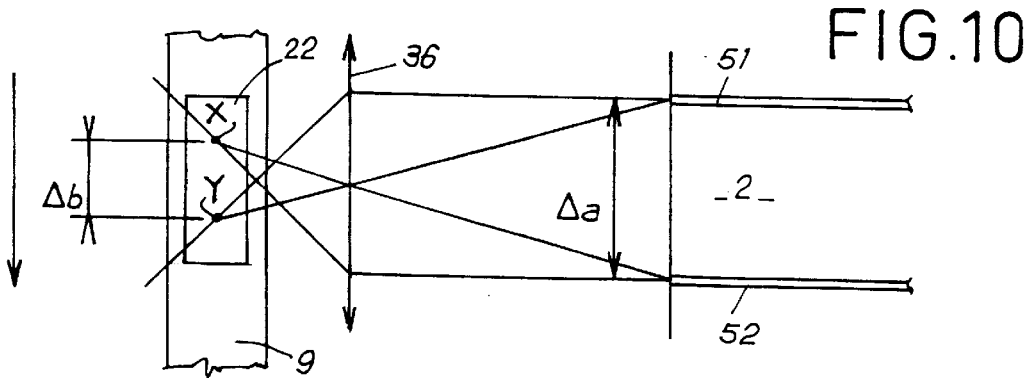
FIG. 10 is a diagram showing a variant embodiment of the FIG. 8 probe that is designed for measurement at small displacement speeds.

The sensitivity of probes of the type shown in FIG. 8, i.e. having a transmission fiber and at least two receiver fibers, can be improved when measuring the temperatures of moving surfaces that moves at a slow speed by adding a complementary lens 36 between the end of the probe 2 and the surface 9 to be scanned (FIG. 10). Thus, by placing said lens at a determined distance between the wall and the probe, it is possible to measure the photoluminescence at two points X and Y of the luminophor covering 22 that are closer together than the distance $\Delta a$ between two successive fibers. The smaller the distance $\Delta b$ between X and Y, the easier it is to measure the temperature of the luminophor layer at slow displacement speeds of the surface to be scanned.

Figure 11:
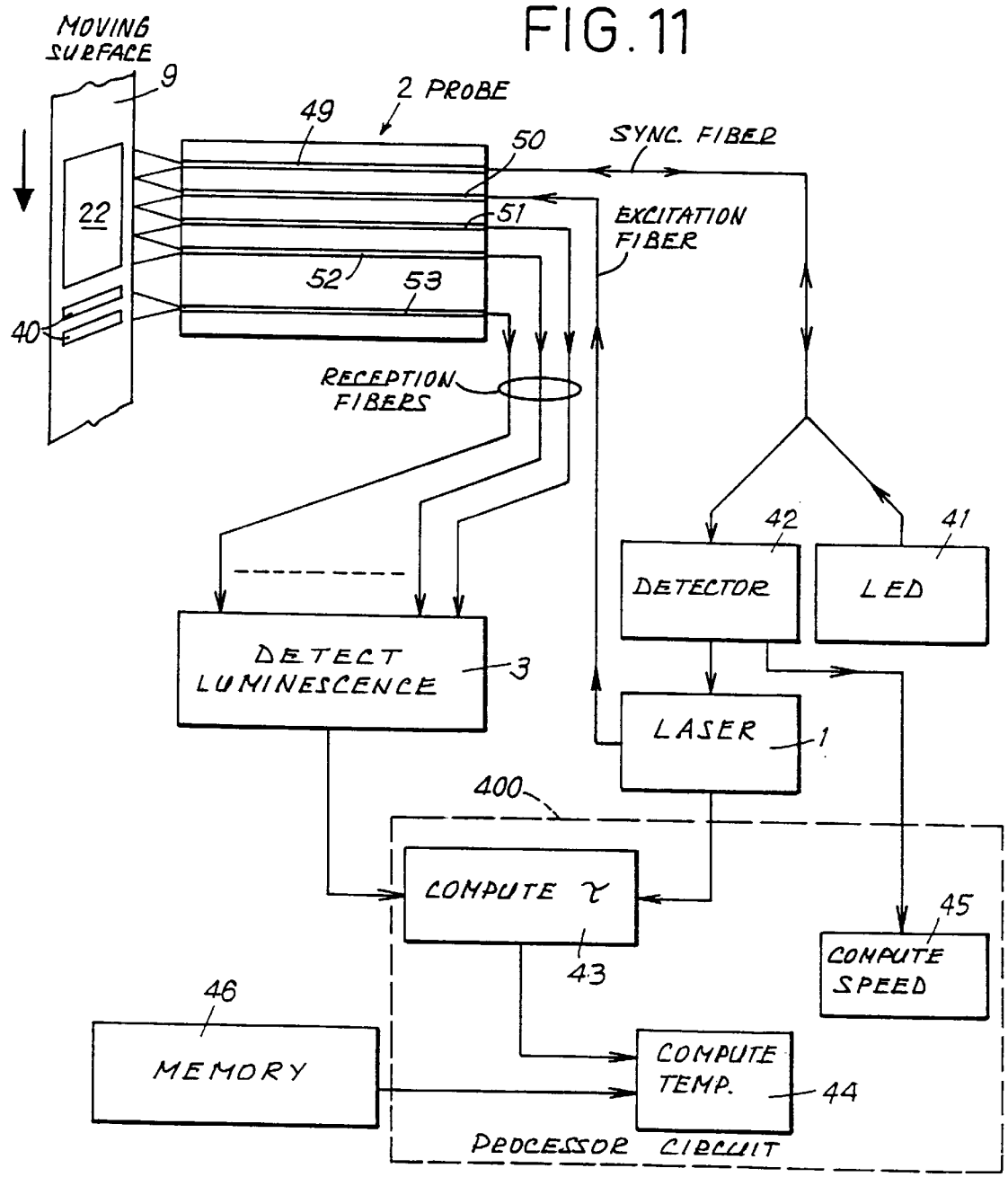
FIG. 11 is a block diagram of an assembly for processing signals from a measurement probe of the type shown in FIG. 8.

FIG. 11 is a diagram showing an entire device for measuring cryogenic temperatures in accordance with the invention. The probe 2 is placed facing the surface to be scanned 9 which is coated, at least in part, with the luminophor covering 22. Additionally, and preferably, the surface 9 is provided with reflecting marks 40 that are spaced apart at a known determined distance $\Delta x$ and that are placed at a determined distance from the crystal covering. The probe includes a synchronization optical fiber 49 which is connected firstly to a synchronization emitter 41 advantageously constituted by a diode that serves to emit continuously in the visible or the infrared spectrum, and secondly by a detector device 42 that serves to detect said emission as reflected by the reflecting marks 40. The detector 41 delivers an output signal for controlling the laser emitter 1 which, at a time $t_0$ that is determined as a function of the passing marks 40, delivers the excitation light flux for the luminophor covering. The receiver fibers 51, 52, 53, etc. of the probe that are provided in a number that is determined but that varies depending on the expected displacement speed, are each connected to the luminescence detection assembly 3 which, at passage instants $t_1$, $t_2$, $t_3$, etc. delivers the intensity of the light flux as received in succession by each of the fibers 51, 52, 53, etc. A first computation circuit 43 responds firstly to the various intensities delivered by the assembly 3 and secondly to information concerning the instant to to compute the decay duration $\tau$. The temperature of the surface 9 is then obtained by a second computation circuit 44 which determines temperature by comparing said decay duration $\tau$ with a set of predetermined values (obtained by prior calibration) as previously stored in a table or memory 46. In addition, a third computation circuit 45 is connected to the detector 42 and serves merely to determine the displacement speed of the surface 9 on the basis of the times that elapse between the passages of two reflecting marks. The various computation circuits are preferably constituted in the form of a single processor circuit 400. It may be observed that the presence of a high number of receiver fibers makes it possible during measurement to select some measurement signals only, thereby facilitating processing of the signals. Similarly, as before, an additional focusing lens may be placed in front of the receiver fibers to facilitate performing measurements at slow speeds.

Figure 12:
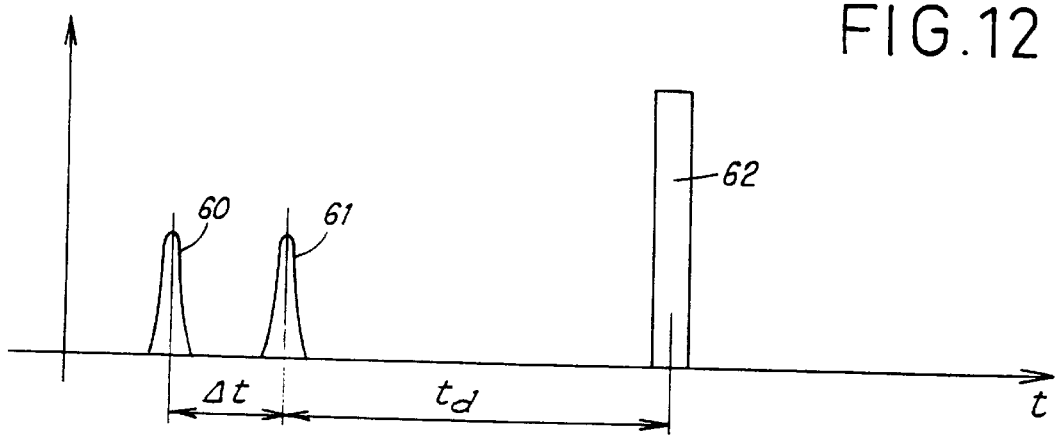
FIGS. 12 and 13 show various signals characteristic of the processing assembly of FIG. 10.
Figure 13:
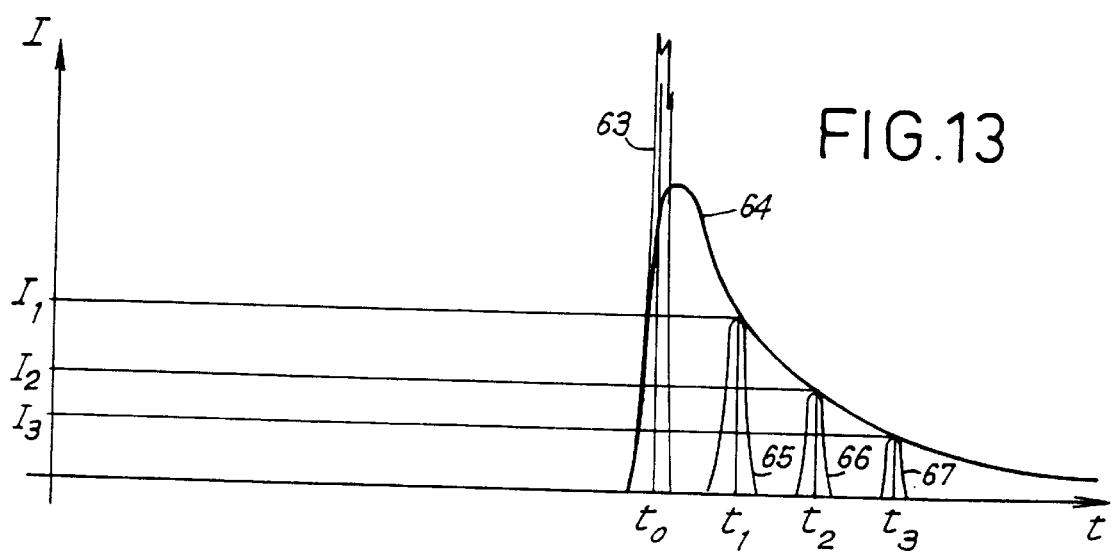

FIGS. 12 and 13 show more clearly how the device of FIG. 11 operates. The synchronization fiber 49 conveys visible or IR light as emitted by the emitter 41 and as reflected 60, 61 by each of the marks 40. These two light pulses 60 and 61 serve, after a time interval $t_d$, to deliver a control pulse 62 to the laser source 1 whose very brief emission in the ultraviolet spectrum then takes place accurately at the precise instant $t_0$ at which the luminophor covering goes past the transmission fiber 50 (the distance between the marks 40 and the covering 22 being known). At this precise instant, the laser delivers an excitation light pulse 63 to the luminophor whose luminescence 64 (fluorescence in the visible part of the spectrum when using $SrF_2:Yb^{2+}$ or $CaF_2:Yb^{2+}$) is subsequently measured in succession at 65, 66, 67, etc. by the various receiver fibers.

When measuring temperatures of a body that is rotating at very high speed, the structure of the probe 2 can be limited to the synchronization fiber 49, the transmission fiber 50, and a single receiver fiber, e.g. 51. The laser source is triggered at to after the two marks have gone past to give rise to excitation of the luminophor covering present on the body at a given location thereon, and a first measurement is then performed at $t_1$, with the second measurement being obtained on the following revolution at $t_1+T$ (where T is the period of rotation of the rotating body). Depending on the duration of the decay of the luminophor and the speed of rotation of the rotating body, the covering may be excited once every revolution, or otherwise.

Calculation has shown that temperature measurements in liquid hydrogen performed on a body rotating at speeds of rotation lying in the range about 18,500 revolutions per minute (rpm) to about 74,000 rpm can be performed using a covering of calcium fluoride doped with divalent ytterbium, and that for speeds lying in the range about 256,500 rpm to 1,025,600 rpm, such measurements can likewise be performed by using a covering of strontium fluoride doped with divalent ytterbium. Similarly, in liquid oxygen, temperature measurements using a covering of calcium fluoride doped with divalent ytterbium can be performed as speeds lying in the range 150,000 rpm to 600,000 rpm.

Figure 14:
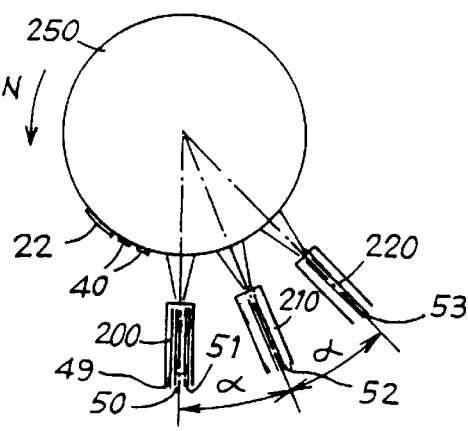
FIG. 14 is a diagram showing how a plurality of measurement probes can be disposed in the vicinity of a rotary body.

In order to enlarge the range of rotary speeds that can be used and thus provide better matching of the measurement device to the operating conditions of the rotary body 250, it is possible (as shown in FIG. 14) to add one or more receiver probes 210, 220 to the above simplified probe structure 200, said additional probes being distributed around the rotary body. The receiver probes 210, 220 have only one optical fiber 52, 53, each for the purpose of measuring luminescence. Thus, during one revolution of the rotary body (during the period T) it is possible to perform as many measurements as there are probes disposed around the body. Nevertheless, depending on its speed of rotation, only intensities that are picked up by certain receiver probes are actually taken into account.

Writing the angular distance (in radians) between two adjacent probes 200, 210 or 210, 220 as $\alpha$, and the speed of rotation in rpm as N, then the transit time from one probe to another is given by the following equation:

$$\Delta t = 30\alpha/\pi N$$

which, given the time interval over which measurements are usable, i.e.

$$\tau/2 < \Delta t < 2\tau$$

defines the following range for measurable speeds of rotation:

$$15\alpha/\pi\tau < N < 60\alpha/\pi\tau$$

From the above characteristics, it can be seen that the field of application of the present invention is particularly large as to speed (10 rpm to 1,000,000 rpm) and as to pressure (0 to 200 bars, or higher depending on the size of the probe). The temperatures of cryogenic fluids having flow speeds of up to 300 m/s or even more (depending on the sizes of the probes), and also the measurement of surfaces moving at such speeds in such a fluid are also possible without special constraints. The special structure of the measurement probe makes it possible to perform measurements in explosive surroundings without taking special precautions and without any danger of electromagnetic disturbances. In its simplified version using a single fiber surrounded by a metal capillary, the receiver probe is particularly compact and robust. In addition, problems associated with measurements performed in surroundings that are highly oxidizing or difficult of access are solved very simply by the present invention.

The luminophors chosen for use in the measurement device make it possible to achieve very good sensitivity at low temperatures with a decay time $\tau$ that is short enough to enable high acquisition rates that may be as great as 1,000 measurements per second, while still being long enough to avoid interference from parasitic luminescence of very short duration.

We claim:

1. A device for optically measuring cryogenic temperatures comprising:
    a light source for exciting a doped crystal; and
    a measurement probe for transporting the light flux emitted by said light source to the doped crystal and for returning to a detection assembly the luminescent light emitted by the doped crystal as a result, wherein the doped crystal is selected from the group consisting of strontium fluoride doped with divalent ytterbium $SrF_2:Yb^{2+}$ and calcium fluoride doped with divalent ytterbium $CaF_2,Yb^{2+}$;
    wherein said measurement probe comprises a housing, a first optical fiber for transmitting the light flux emitted by the light source and a second optical fiber for returning the light emission given off by the doped crystal, a metal capillary surrounding said first optical fiber and wherein the doped crystal is present in the form of a cover disposed at a determined location on the surface to be scanned and the measurement probe further includes a synchronizing optical fiber for transmitting and receiving synchronizing light emission, and wherein a surface to be scanned further includes at least one mark reflecting said synchronizing light emission and placed in a displacement direction of the surface at a determined distance from the crystal.

2. A device according to claim 1 for optically measuring cryogenic temperatures, wherein each of said first and second fibers are surrounded by a metal capillary.

3. A device according to claim 1 for optically measuring cryogenic temperatures, wherein the housing further includes a lens placed at the outlet from the optical fibers.

4. A device according to claim 1 for optically measuring cryogenic temperatures, further including additional focusing means disposed between the probe and the surface to be scanned and placed at the outlet from the second fiber.

5. A device for optically measuring cryogenic temperatures comprising a light source, a doped crystal selected from the group consisting of strontium fluoride doped with divalent ytterbium $SrF_2:Yb^{2+}$, and calcium fluoride doped with divalent ytterbium $CaF_2:Yb^{2+}$; a measurement probe comprising a housing, a first optical fiber for transmitting the light flux emitted by the light source, a synchronizing optical fiber for transmitting and receiving synchronizing light emission, and at least one receiver fiber for returning the light emission given off by the crystal, each of said fibers being surrounded by a metal capillary, and wherein said excitation light source is controlled on the basis of a detector device receiving the light flux emitted by a synchronization emitter and returned by reflecting marks, the detection assembly receiving in succession light emissions emitted by the crystal via each of the receiver fibers and further including a processor circuit receiving information from the light source, from the detection assembly, and from a memory containing a set of predetermined values.

6. A device according to claim 5 for optically measuring cryogenic temperatures, wherein said processor circuit includes a first circuit for determining the duration $\tau$ of the decay of luminescence from the crystal covering, and a second circuit for computing the temperature of the surface to be scanned on the basis of values stored in the memory.

7. A device according to claim 5, for optically measuring cryogenic temperatures, wherein said processor circuit further includes a third circuit for computing the displacement speed of the surface to be scanned.

* * * * *